United States Patent [19]
Pandey et al.

[11] Patent Number: 5,983,356
[45] Date of Patent: *Nov. 9, 1999

[54] POWER CONSERVATION METHOD AND APPARATUS ACTIVATED BY DETECTING SHADOWED INTERRUPT SIGNALS INDICATIVE OF SYSTEM INACTIVITY AND EXCLUDING PREFETCHED SIGNALS

[75] Inventors: Vimi Pandey, Santa Clara; Kenneth Ma, Cupertino; Leo Jiang; Scott Shaw, both of Fremont, all of Calif.

[73] Assignee: National Semiconductor Corporation, Santa Clara, Calif.

[*] Notice: This patent is subject to a terminal disclaimer.

[21] Appl. No.: 08/665,778

[22] Filed: Jun. 18, 1996

[51] Int. Cl.$^6$ ........................................................ G06F 1/00
[52] U.S. Cl. ............................................ 713/322; 713/320
[58] Field of Search .................................. 395/750, 580, 395/587, 586, 588; 364/707

[56] References Cited

U.S. PATENT DOCUMENTS

| | | | |
|---|---|---|---|
| 5,222,239 | 6/1993 | Rosch ........................................ | 395/750 |
| 5,377,344 | 12/1994 | Stager et al. ............................ | 395/425 |
| 5,386,552 | 1/1995 | Garney ...................................... | 395/575 |
| 5,404,537 | 4/1995 | Olnowich et al. ...................... | 395/725 |
| 5,426,755 | 6/1995 | Yokouchi et al. ...................... | 395/425 |
| 5,438,681 | 8/1995 | Mensch, Jr. ............................. | 395/800 |
| 5,475,848 | 12/1995 | Ikeda ........................................ | 395/750 |
| 5,511,203 | 4/1996 | Wisor et al. ............................ | 395/750 |
| 5,546,037 | 8/1996 | Kenny et al. ........................... | 327/230 |
| 5,585,745 | 12/1996 | Simmons et al. ...................... | 326/93 |
| 5,590,342 | 12/1996 | Marisetty ................................ | 395/750 |

FOREIGN PATENT DOCUMENTS

| | | | |
|---|---|---|---|
| 0656 579 A2 | 6/1995 | European Pat. Off. .......... | G06F 1/32 |

OTHER PUBLICATIONS

Shanley et al., "ISA System Architecture", PC System Architecture Series, vol. 1, MindShare, Inc., pp. 331–366, 1993.

"Vesuvius–LS Pentium Processor PCI System Controller", Pico Power, A Cirrus Logic Company, Advance Version 0.6, pp. 54–67, Mar. 1995.

Pico¦Power A Cirrus Logic Division, VESIVIUS–LS, Pentium Processor PCI System Controller, Preliminary Data Book, Version 0.7, Sep., 1995.

"Pico Power VESUVIUS–LS Preliminary Data Book", National Semiconductor, pp. i–xii, 1–32—1–34, 1–60–77, 1–130—1–210, 3–320—, 3–337—3–343, Mar. 1996.

*Primary Examiner*—Ayaz R. Sheikh
*Assistant Examiner*—Jigar Pancholi
*Attorney, Agent, or Firm*—Limbach & Limbach, L.L.P.

[57] ABSTRACT

A method and apparatus is disclosed for controlling the application of a clock stopping signal in a processor to limit power consumption. The system controller receives addresses, signals indicative of primary and secondary system activity, and at least one nap timeout signal. Interrupt addresses or programmed addresses are trapped and stored as shadowed addresses. Current addresses may be compared with shadowed addresses. Matching addresses trigger a nap mode. Upon nap mode triggering, the clock stopping signal may be applied during a throttling period. Applying the clock stopping signal with programmable duty cycle during the throttling period ensures that processing necessary for the detection and servicing of primary and secondary activity can occur. A prefetch detect circuit ensures that shadowed addresses loaded in the middle of a prefetch do not trigger the clock stopping signal. Clock stopping signal is removed or inhibited when primary or secondary activity is detected or when a nap timer expires.

23 Claims, 11 Drawing Sheets

POWER CONSERVATION METHOD AND APPARATUS ACTIVATED BY DETECTING SHADOWED INTERRUPT SIGNALS INDICATIVE OF SYSTEM INACTIVITY AND EXCLUDING PREFETCHED SIGNALS

CROSS-REFERENCE TO RELATED APPLICATIONS

The present application is related to the following two co-pending applications, each entitled "METHOD AND APPARATUS FOR CONSERVING POWER IN A COMPUTER SYSTEM BY CONTROLLING A CLOCK STOPPING SIGNAL": application Ser. No. 08/649,531, filed May 17, 1996, and application Ser. No. 08/650,355, filed May 20, 1996.

FIELD OF THE INVENTION

The present invention relates to personal computer power conservation and management and relates to a method and apparatus for controlling application of a clock stopping signal to a processor to conserve power.

BACKGROUND OF THE INVENTION

Proliferation of battery-powered portable personal computers and increasing public awareness of practical and environmental issues related to energy conservation may create a demand to conserve power in computing devices. For portable computers, thermal management and battery longevity concerns drive power conservation efforts. In desktop computing devices, power conservation relates to conserving natural resources in keeping with government and industry standards such as EPA's EnergyStar standard.

Portable computers may only be useful if battery life supports a reasonable period of use between charges. Sufficient periods of time may be necessary to allow users to complete lengthy tasks or series of tasks. Modern portable computer batteries, even when rated for eight hours of use, may have lives of only about two or three hours between charges when continuously running CPU intensive tasks. Additional concerns regarding thermal runaway may be compounded in a high clock speed environment during extended periods of heavy processing loads.

Clock speed is known in the art to have a direct relationship to power consumption. Lee, et al., U.S. Pat. No. 5,254,888, issued on Oct. 19, 1993 and incorporated herein by reference discloses an Intel 486 CPU operating at 33 MHz may dissipate about 4 watts of power. Lee, et al. discloses a technique for saving power by slowing the clock during wait states. However, the technique disclosed in Lee may not accomplish selective application of a clock stopping signal within programmed intervals while the system may be in one of several power conservation modes.

Modern operating environments such as Microsoft® Windows® with graphical user interfaces (GUI), even when idle, may require more processing from the CPU than non-GUI based operating systems. Thus, a portable computer which is running a GUI based operating system may experience shorter battery life when idle than its idle non-GUI counter part. Other system components such as displays, disk drives, and keyboards consume system power when accessing processor resources. Reducing power consumed by these system components while maintaining the ability to monitor their activity and provide them with processing resources without delay may be desirable.

Prior art power conservation methods such as sleep modes which disable the processor more completely, may have the disadvantage of long wake-up latencies. Service to system peripherals may not be possible until full processor wake-up. Providing system peripherals with faster access to processor service may shorten wake-up latency. Shortening wake-up latency may translate to more tolerable wait times for the user as the system wakes up. Moreover, some processing requests may be serviced in the background without requiring full wake-up. By making it possible for some activity to be processed during sleep modes, a wider array of activity may be available to trigger wake-up.

Interrupts are known in the art and may be generated when system activity is present either from user input or from peripherals which require processor service. Peripheral devices may request service from a processor through an interrupt request. Interrupt requests may be serviced through the execution of an Interrupt Service Routine (ISR). When an interrupt occurs, the processor stops executing a present program and begins executing the ISR as discussed in Chapter 18, pp 331–366, ISA System Architecture, Shanley and Anderson, MindShare Press, 1991, 1993, incorporated herein by reference. The processor may respond to an interrupt request and determine which device or software process initiated the request by obtaining the associated interrupt number. Once the identity of the interrupt is determined by interrupt number, the address of the ISR may be found from the interrupt vector table (IVT) and the ISR executed. When the ISR is finished executing, execution may resume at the location stored when the processor was interrupted.

Interrupts may be generated from system activity related to keyboard input, disk drive access, peripheral access, and other system events. Conversely, other interrupts may be indicative of system inactivity. ISRs for software interrupts may be programmed into BIOS ROM and loaded into corresponding interrupt number entries in the IVT at startup. The IVT may reside in the real mode address space 00000H to 003FFH. In protected mode, the IVT can be relocated anywhere in memory.

Some prior art systems perform selective memory transaction monitoring as in Stager, et al., U.S. Pat. No. 5,377,344 issued on Dec. 27, 1994, and store values in a shadow RAM. Storing values in a RAM is well known in the art. Garney, U.S. Pat. No. 5,386,552 issued Jan. 31, 1995, discloses a system to preserve the processing state in a mass storage system. In Garney's system, a shadowed interrupt vector does not appear to be disclosed as a nap triggering event nor does any interrupt appear to be disclosed as a nap triggering event.

Common DOS fixed software interrupt INT16H, for example, is well known. Interrupt INT16H, known as the Keyboard Services interrupt is described in The Proarammer's PC Sourcebook, 2nd Ed., Tom Hogan, Microsoft Press, 1991, incorporated herein by reference. When there is no input from a user, DOS may loop on INT16H looking for keyboard activity. Detecting such system looping on INT16H in itself may be used to trigger sleep modes. Subsequent activity may trigger a system to wake up. However, as described earlier, an often prolonged period must be endured for the system to wake-up in order to begin or resume a task. Then, when processing is restored, all processing resources may be available.

Such an approach may be inefficient since a demand for immediate processing may be present once wake-up activity is detected by the wake-up event itself. Other system events or activity may demand immediate processing but for a short period of time, while still other system events or activity may call for processing of a background nature. Moreover, there may be small intervals between events too small to activate sleep modes but susceptible to being used to achieve a power savings. During such relatively short time intervals where full processor resources may be available, there may not be a corresponding need for processing.

SUMMARY OF THE INVENTION

To overcome the limitations of the prior art, the present invention is embodied in a system controller disposed within a computer system which receives signals including address signals, signals indicative of primary and secondary activity, and at least one nap timeout signal. Addresses which match shadowed addresses trigger the generation of a nap signal. The nap signal may be applied to a stop clock state machine which generates a clock stopping signal. The clock stopping signal is applied to the processor to suspend processing. A plurality of mode timers determine when the computer system may be advanced to a progressively lower power mode. Any primary or secondary activity may be applied to the logic circuit resulting in the deassertion of the nap signal in one of at least two modes. Deassertion of the nap signal results in the clock stopping signal being removed. Full speed processing resumes upon removal of the clock stopping signal in certain instances.

In the preferred embodiment of the present invention, a prefetch detect circuit may generate a prefetch detect signal if the present address decoded from the bus is offset by one from the previous address stored in a register. When prefetching, the processor may read a predetermined amount of information from contiguous, sequential locations in memory. Sequential memory locations may have the characteristic of being addressed with values one greater than the previous address. Such an intrinsic characteristic may be an indication that the processor is prefetching rather than executing.

Information accessed during prefetch may be called a prefetch line. The length of a prefetch line may vary arbitrarily and may be subject to addressing limitations. In the present embodiment the prefetch line may be thirty-two bytes. If an interrupt address match is found within the first eight bytes of a prefetch line, as determined by its presence within the prefetch detect circuit as either the present address or the previous address, a prefetch detect signal may be generated. As each new address appears on the address bus, the present address may be stored in a register and may become the previous address for comparison purposes during the next cycle. When the present address is equal to the previous address plus one, a prefetch detect signal may be generated and applied to a logic circuit which inhibits the generation of the nap signal. Interrupt addresses within a prefetched line may be prevented from asserting the nap signal during prefetches and degrading performance through false nap triggering.

Also within the preferred embodiment, a throttling circuit, which may be selectively enabled, controls the application of the clock stopping signal during a throttling period. A value corresponding to the duration of a throttling period may be stored in a register coupled to the throttling circuit. The clock stopping signal of a particular duty cycle may be applied during the throttling period. A value corresponding to the percent duty cycle of the clock stopping signal may be stored in another register also coupled to the throttling circuit. The clock stopping signal may also be applied continuously if throttling is disabled.

As described, interrupts may be generated when system activity is present either from user input or from peripherals which require processor service. Typical system activity may be characterized in the present invention as primary and secondary activity. Primary or secondary activity may occur during the throttling period. The occurrence of primary activity may cause the system to return to a fully-on mode. Secondary activity may cause the activity to be serviced and the system to return to the previous power conservation mode upon completion of service. Applying the clock stopping signal in a periodic manner during throttling ensures that detection of such primary and secondary activity may not be degraded. A plurality of power conservation modes allow a system to return instantly to processing. The power management modes may include Fully-On, Conserve, Doze, Sleep, Deep-Sleep, Suspend, or the like.

DETAILED DESCRIPTION OF THE INVENTION

The descriptions herein are by way of example only illustrating the preferred embodiment of the present invention. However, it should be appreciated that the method and apparatus of the present invention may be applied in a similar manner in other embodiments without departing from the spirit of the invention.

In general, the present invention conserves power in a personal computer system while allowing primary and secondary events to be detected and serviced. In the present invention, a plurality of power conservation modes may be progressively achieved in the absence of primary activity as respective mode timers expire. Upon detection of certain primary and secondary events, full or partial wake-up may be triggered in order to perform necessary processing. If the system is already in a fully-on mode, and there is no primary or secondary activity, a nap mode may be triggered by the occurrence of programmed addresses indicative of system inactivity.

Figure 1:
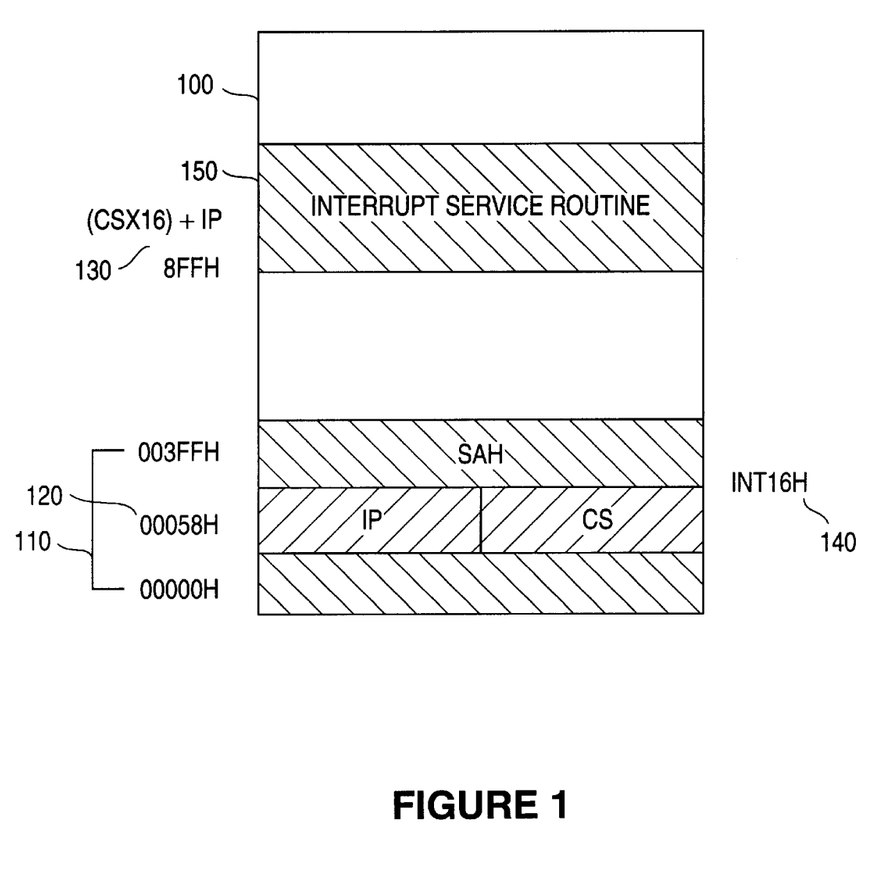
FIG. 1 is a diagram of system memory illustrating an interrupt vector table, an interrupt number entry, Code Segment (CS) and Instruction Pointer(IP), and an interrupt service routine.

FIG. 1 illustrates an example of interrupt vector table located in address space 110 in memory area 100. When the computer system of the present invention begins execution from power-on, ISR addresses for common software interrupts may be loaded into interrupt table addresses according to respective interrupt numbers. The ISR addresses corresponding to interrupt numbers may be loaded into address space 110 from 00000H to 003FFH by BIOS startup routines. Interrupt entry 140 may correspond to interrupt number INT16H. Interrupt entry address 120 for interrupt entry 140 may be 00058H. Interrupt entry address 120 may be calculated by multiplying an interrupt number, such as INT16H, by four. The number four may correspond to the number of bytes which form the ISR address in Code Segment (CS) plus Instruction Pointer (IP) form which may be commonly referred to as segment plus offset form. The two most significant bytes at interrupt address 120 may represent the CS value. The two least significant bytes may represent the IP value. For example, interrupt 140 corresponds to INT16H. Sixteen may be multiplied by four and converted into hexadecimal to calculate an interrupt table address 120 of 00058H. In the preferred embodiment, interrupt address 120 may contain a CS and IP value. In the present invention, an interrupt number or the CS and IP values of an interrupt vector may be programmable in registers and when the incoming address matches either of these, nap triggering may occur.

The four bytes of address 120 may comprise the CS and IP values used to form an address of ISR 150. ISR 150 may be executed as part of a CPU INT cycle whenever INT16H is identified as a present interrupt number. ISR 150 located at ISR address 130 may be calculated by multiplying the CS value read from the third and fourth bytes of interrupt address 120 by sixteen then adding the IP value obtained from the first and second bytes of interrupt address 120. As described earlier, ISR 150 may be loaded during startup at ISR address 130 by BIOS for common software interrupts. ISR 150 may also be loaded by an application or other software. Loading ISR 150 allows a custom ISR for a particular interrupt number to replace a standard ISR. Other ISRs may be loaded at other addresses and these ISR addresses loaded in the interrupt vector table in a corresponding interrupt number address by BIOS at startup, an application, or other software when hooking an unused interrupt or a fixed interrupt.

Figure 2:
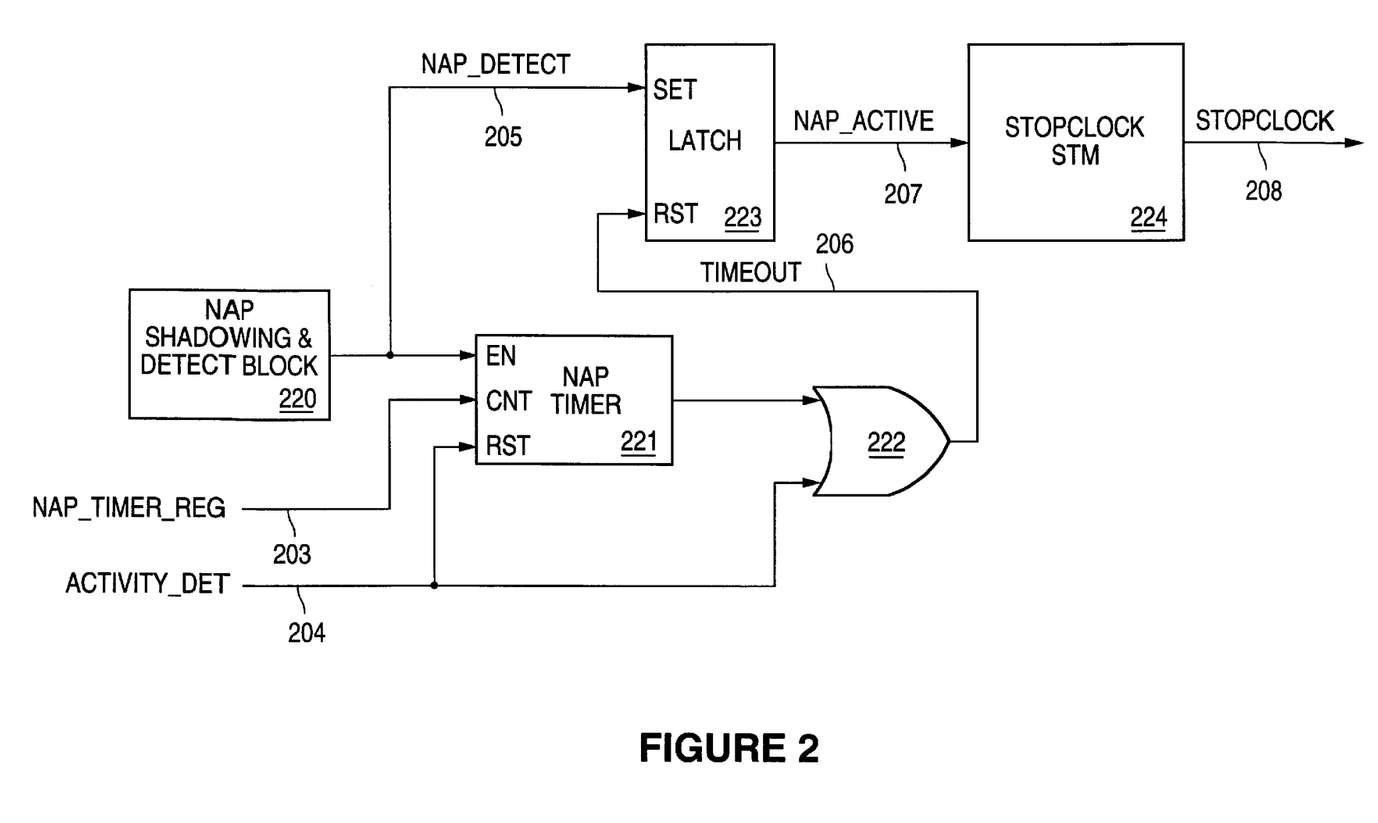
FIG. 2 is a logic diagram illustrating the overall circuit.

In FIG. 2, the nap shadowing and detect block 220 implements the nap shadowing and detection logic and generates NAP_DETECT signal 205. NAP_DETECT signal 205 is input to the SET pin of LATCH 223 and sets NAP_ACTIVE signal 207 high. NAP_DETECT signal 205 is also input to the EN pin of the NAP_TIMER which starts counting to the value programmed in NAP_TIMER_REG register 203. Upon reaching the programmed count, TIMEOUT signal 206 goes high which resets the NAP_ACTIVE signal 207. ACTIVITY_DET signal 204 indicates the presence of primary or secondary activity and can reset both the NAP_TIMER 221 and the NAP_ACTIVE latch 223. The NAP_ACTIVE signal 207 is input to the STOP-CLOCK State Machine 224. While NAP_ACTIVE is high, the STOPCLOCK signal 208 will be throttled if throttling is enabled or kept asserted if LESSTOP is enabled. In the present embodiment, thirty-two bit addressing is shown. It is possible however, for this invention to be embodied in systems with a larger addressing capability.

Figure 3:
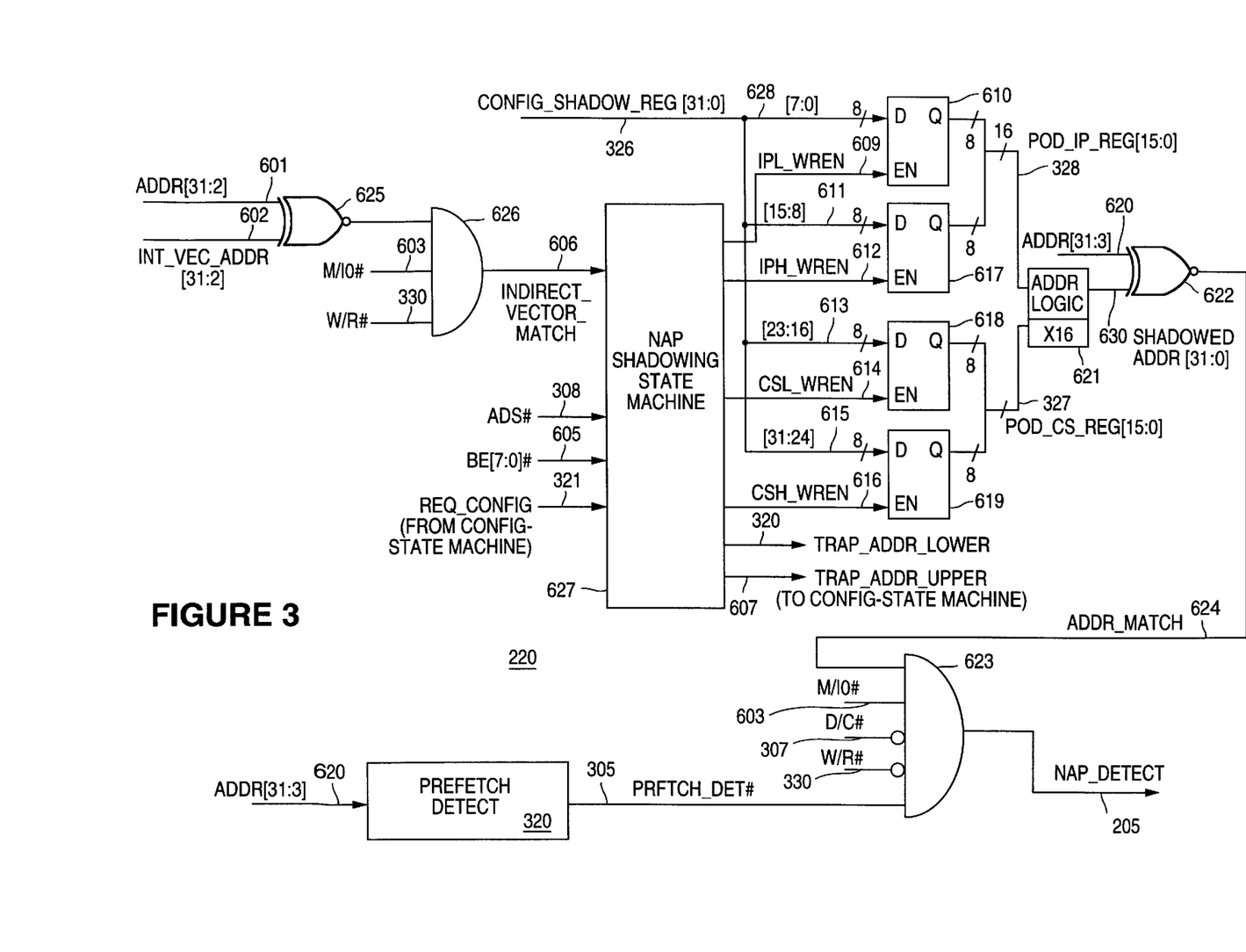
FIG. 3 is a diagram illustrating the nap shadowing state machine, the prefetch detect state machine and the nap detect circuit.

FIG. 3 is a diagram illustrating the nap shadowing state machine, prefetch state machine and nap detect circuit of the present invention. Present address ADDR[31:2] 601 is input to gate 625. INT_VEC_ADDR[31:2] 602 which represents a interrupt vector address such as 58H for INT16H is also input to gate 625. If there is a match between ADDR[31:2] 601 and INT_VEC_ADDR[31:2] 602, a logical output is input from gate 625 to gate 626. M/IO# signal 603 indicates whether the present address is a memory address or an I/O address and is input to gate 626. W/R# signal 330 indicates whether the present address is being written or read and is input to gate 626. The logical output of gate 626 is INDIRECT_VECTOR_MATCH signal 606 which is input to NAP SHADOWING STATE MACHINE 627.

INDIRECT_VECTOR_MATCH signal 606 is generated upon a match between ADDR[31:2] 601 and INT_VEC_ADDR[31:2] 602 provided M/IO# signal 603 and W/R# signal 330 are high. NAP SHADOWING STATE MACHINE 627, receives ADS# signal 308 which indicates when present address ADDR[31:2] is valid. BE[7:0]# signal 605 indicates the byte enables and decodes which bytes of data are being written and is input to NAP SHADOWING STATE MACHINE 627. REQ_CONFIG signal 321 is from a configuration state machine and indicates when the data which consists of the CS and IP values of the ISR routine for the interrupt is successfully shadowed.

The configuration state machine handles various functions for the whole system controller and is not specifically dedicated to the shadowing function related to the present invention. Therefore, only the function of shadowing the data by this state machine will be described in detail.

Shadowing in the context of the present invention means loading the values of interrupt vectors from the data bus into shadow registers. The NAP SHADOWING STATE MACHINE 627 detects when interrupt vector address are loaded or changed and causes the configuration state machine to load an upper or lower double-word of the data bus of the present invention based on the assertion of TRAP_ADDR_UPPER 607 or TRAP_ADDR_LOWER 320. Since the shadowed data in the present invention is 32 bits consisting of 16-bit CS value and 16-bit IP value, four 8 bit latches are used to latch the data which forms the shadowed address. This allows the logic to shadow the CS and IP values even if they are written a byte at a time.

The configuration state machine stores the shadowed address values in CONFIG_SHADOW_REG[31:0] 326 and may be input in 8 bit blocks to each of four latches 610, 617, 618, and 619. CONFIG_SHADOW_REG[7:0] 628 is input to latch 610 and contains the least significant 8 bits of the shadowed address. IPL_WREN signal 609 indicates when there is a write operation of shadowed address Instruction Pointer (IP) low byte value by decoding the byte enable BE[7:0]# and clocks CONFIG_SHADOW_REG[7:0] 628 through to the Q output of latch 610. CONFIG_SHADOW_REG[15:8] 611 is input to latch 617 and contains the next most significant 8 bits of the shadowed address. IPH_WREN signal 612 indicates when there is a write operation of shadowed address Instruction Pointer (IP) high byte value by decoding the byte enable BE[7:0]# and clocks CONFIG_SHADOW_REG[15:8] 611 through to the Q output of latch 617. POD_IP_REG[15:0] signal 328 represents shadowed address' combined IP low byte and high byte values and is input to adder 621.

CONFIG_SHADOW_REG[23:16] 613 is input to latch 618 and contains the next most significant 8 bits of the shadowed address. CSL_WREN signal 614 indicates when there is a write operation of shadowed address Code Segment (CS) low byte value and clocks CONFIG_SHADOW_REG[23:16] 613 through to the Q output of latch 618. CONFIG_SHADOW_REG[31:24] 615 is input to latch 619 and contains the most significant 8 bits of the shadowed address. CSH_WREN signal 616 indicates when there is a write operation of shadowed address Code Segment (CS) high byte value and clocks CONFIG_SHADOW_REG[31:24] 615 through to the Q output of latch 619. POD_CS_REG[15:0] signal 327 represents shadowed address' combined CS low byte and high byte values and is input to adder 621. When interrupt addresses are to be shadowed, TRAP_ADDR_LOWER 320 and TRAP_ADDR_UPPER 607 may be output from states 803 and 804 respectively in the NAP SHADOWING STATE MACHINE illustrated in FIG. 7 to a configuration state machine which captures the lower or upper double-word of the data bus into the CONFIG_SHADOW REG[31:0].

A complete shadowed address SHADOWED_ADDR [31:0] 630 is output from adder and multiplier 621 and input to gate 622. ADDR[31:3] 620 is also input to gate 622. When ADDR[31:3] 620 and shadowed address match, ADDR_MATCH signal 624 may be generated and output from gate 622 to gate 623. M/IO# signal 603 indicative of whether the present address is a memory address or an IO address may also be input to gate 623. W/R# signal 330 indicative of whether the present operation is a read or a write operation and D/C# signal 307 indicative of a data or code cycle may also be input to gate 623. PRFTCH_DET# signal 305 indicative of whether the present address is part of a prefetch line may be output from Prefetch Detect block 320 and may also be input to gate 623. Provided the input signals are in the proper active state, NAP_DETECT signal 205 may be output from gate 623 and triggers a nap mode.

Prefetched addresses may be prefetched thirty-two bytes at a time in the preferred embodiment of the invention. However, an embodiment which prefetched more or less than thirty-two bytes and comprised a means for detecting whether programmed addresses were part of the prefetch line would not depart from the spirit and scope of the present invention. Since the least significant three address lines are not read, each difference of one between addresses represents differences of eight in the hexadecimal value of the decoded addresses. An active low PRFTCH_DET# signal 305 may be generated by prefetch detect circuit 320 when addresses are part of a prefetch line. Prefetch lines may exhibit a characteristic wherein present addresses may differ from previous addresses by a value of one indicating that the addresses were retrieved from sequential locations in memory.

Figure 4A:
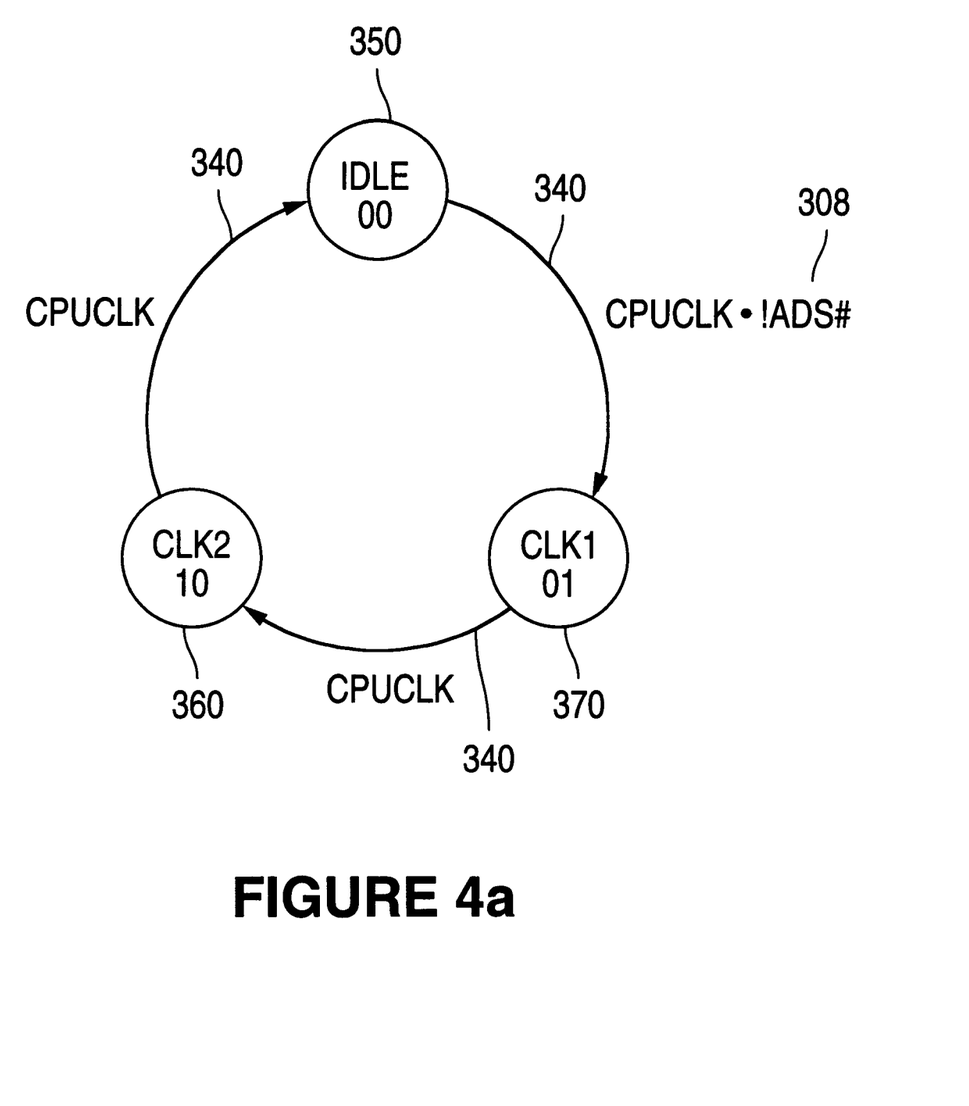
FIG. 4a is a state machine diagram illustrating the operation of the prefetch detect state machine of FIG. 3.
Figure 4B:
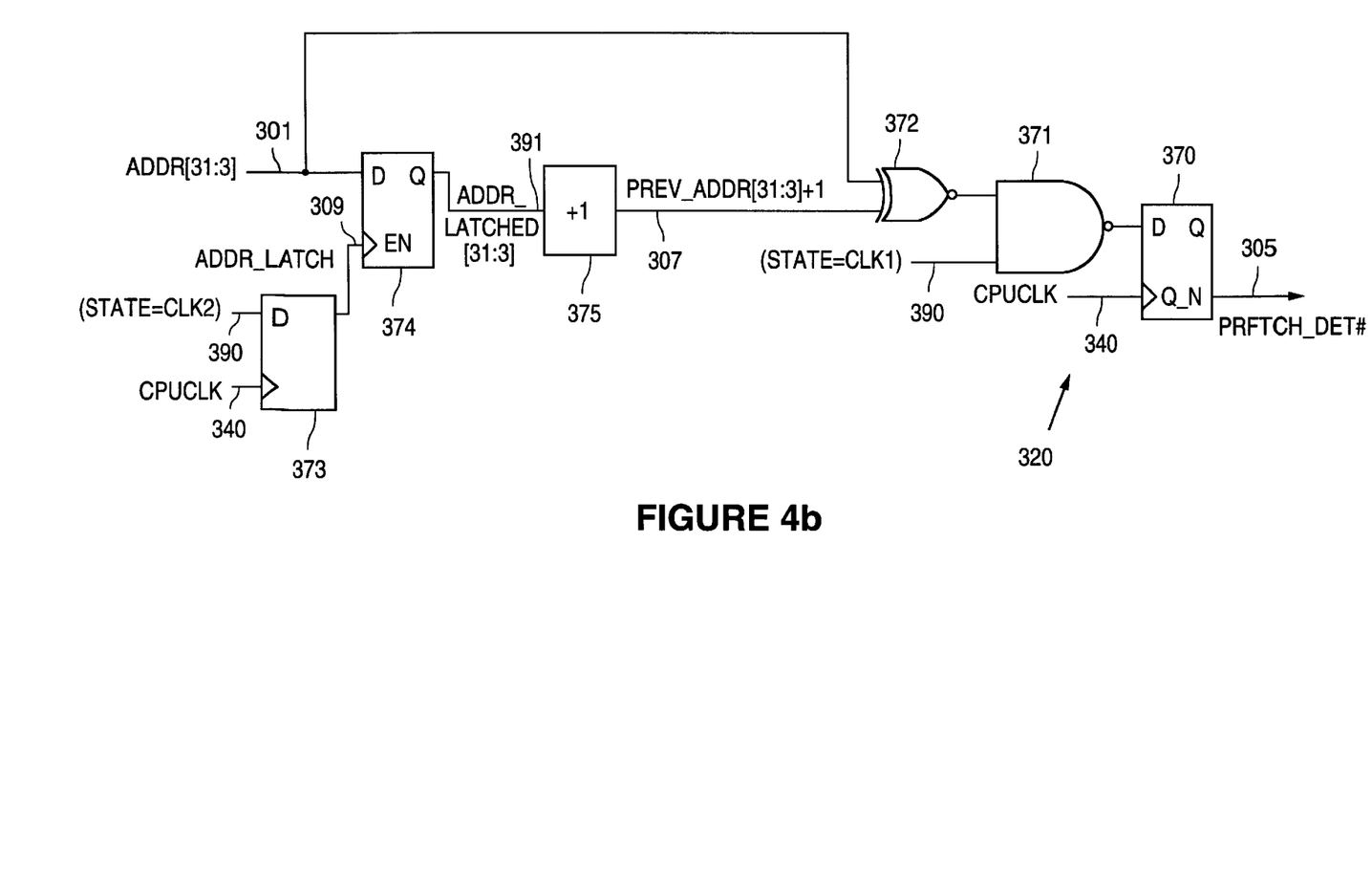
FIG. 4b is a logic diagram illustrating the prefetch detect state machine of FIG. 3.

FIG. 4a is a state machine diagram illustrating the operation of prefetch detect circuit 320 of FIG. 3 which is illustrated in more detail in FIG. 4b. From IDLE state 00, 350, the occurrence of CPUCLK signal 340 indicative of a clock transition in conjunction with an active low ADS# signal 308 indicative of a valid address may cause a state machine transition to CLK1 state 01, 370. In CLK1 state 01, 370, a present address match may be compared with the previous address or prefetched address. If the present address matches the value of one plus the previous address indicating a prefetched address, a signal indicative of prefetch detect may be asserted. From CLK1 state 01, 370, occurrence of CPUCLK signal 340 may cause a state machine transition to CLK2 state 10, 360. In CLK2 state 10, 360, the present address may be clocked into the prefetch detect circuit for use in subsequent state machine cycles. A final transition of CPUCLK signal 340 may cause the state machine to transition back to IDLE State 00, 350.

FIG. 4b is a logic diagram illustrating the prefetch detect circuit of FIG. 3. ADDR[31:3] 301 is input to the D input of latch 374 and input to logic gate 372. CPUCLK 340 is input to the enable input of latch 373 and STATE 390 is input to the D input of latch 373. Flip-Flop 373 may generate ADDR_LATCH signal 309 if STATE 390 equals CLK2 signal 360. ADDR_LATCH signal 309 may be input to the enable input of latch 374 to enable the present value of ADDR[31:3] 301 to be latched and output at the Q output of latch 374 as ADDR_LATCHED[31:3] 391. Once ADDR [31:3] 301 is latched and output from latch 374 as ADDR_LATCHED[31:3] 391, a delay of one clock cycle may then exist between the present value of ADDR[31:3] 301 and ADDR_LATCHED[31:3] 391 latched on the previous cycle. A value of 1 may be added to ADDR_LATCHED [31:3] 391 in block 375 and PREV_ADDR[31:3]+1 307 may be generated and output to logic gate 372. The logical product of PREV_ADDR[31:3]+1 307 and ADDR[31:3] 301 may be output to logic gate 371. STATE 390 may also be applied to logic gate 371 and the logical product applied to the D input of latch 370. When STATE 390 has a value of CLK1, and PREV_ADDR[31:3]+1 307 matches ADDR [31:3] 301, latch 370 may generate PRFTCH_DET# 305 indicating that address ADDR[31:3] 301 is part of a prefetch line. Because addresses fetched in prefetch lines are sequential, meaning one address differs from the next by a value of one, comparing whether present address ADDR [31:3] 301 matches PREV_ADDR[31:3]+1 307 may indicate that ADDR[31:3] 301 is a prefetched address. It may be undesirable to trigger a nap mode on a prefetched address which may be an interrupt address.

Figure 4C:
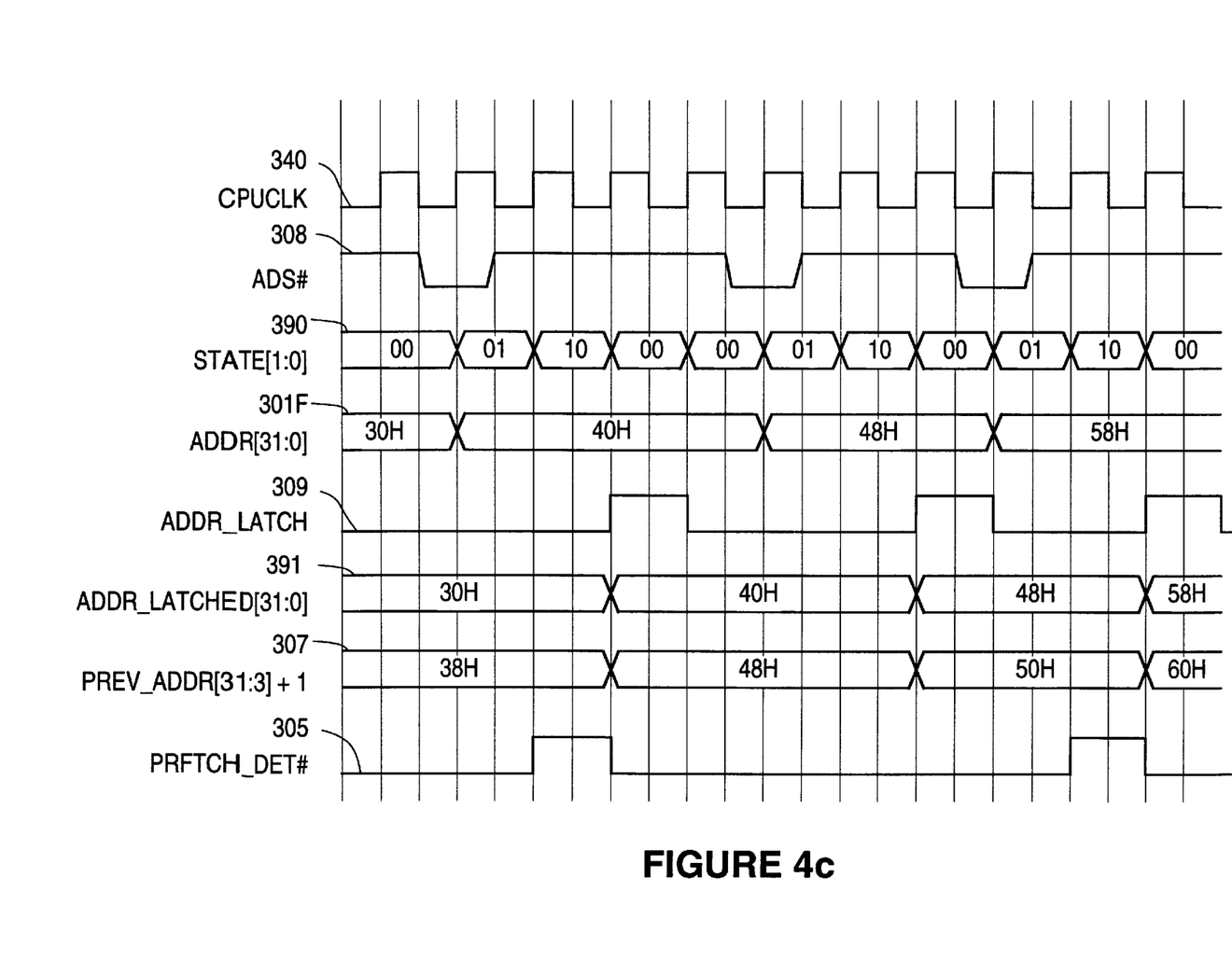
FIG. 4c is a timing diagram illustrating the timing of the prefetch detect state machine of FIG. 3.

FIG. 4c is a timing diagram illustrating the timing of the prefetch detect state machine 320 illustrated in FIG. 4b. CPUCLK 340 may be used to synchronize circuit operation to processor operation. ADS# signal 308 may be used to indicate that data on the system bus represent valid addresses. STATE 390 may be used to advance the operation of the prefetch detect state machine during subsequent cycles of CPUCLK 340. ADDR[31:0] 301f may represent a present address read from the system bus and used within prefetch detect circuit illustrated in FIG. 4b. ADDR_LATCH signal 309 may be used to latch bits[31:3] of present address ADDR[31:0] 301f into latch 374 of FIG. 4b. Once bits[31:3] of address ADDR_LATCHED[31:0] 391f are latched, a value of one is added. Address PREV_ADDR [31:3]+1 307 represents address ADDR_LATCHED[31:3] 391 plus one and is compared to present address ADDR [31:3] 301. If ADDR_LATCHED [31:3] 391 and present address ADDR[31:3] 301 match then the processor is presumed to be prefetching and signal PRFTCH_DET# 305 is generated. If there is not a match, then signal PRFTCH_DET# 305 is set high or deasserted for one clock by the prefetch detect state machine 320 of FIG. 4b.

Figure 5:
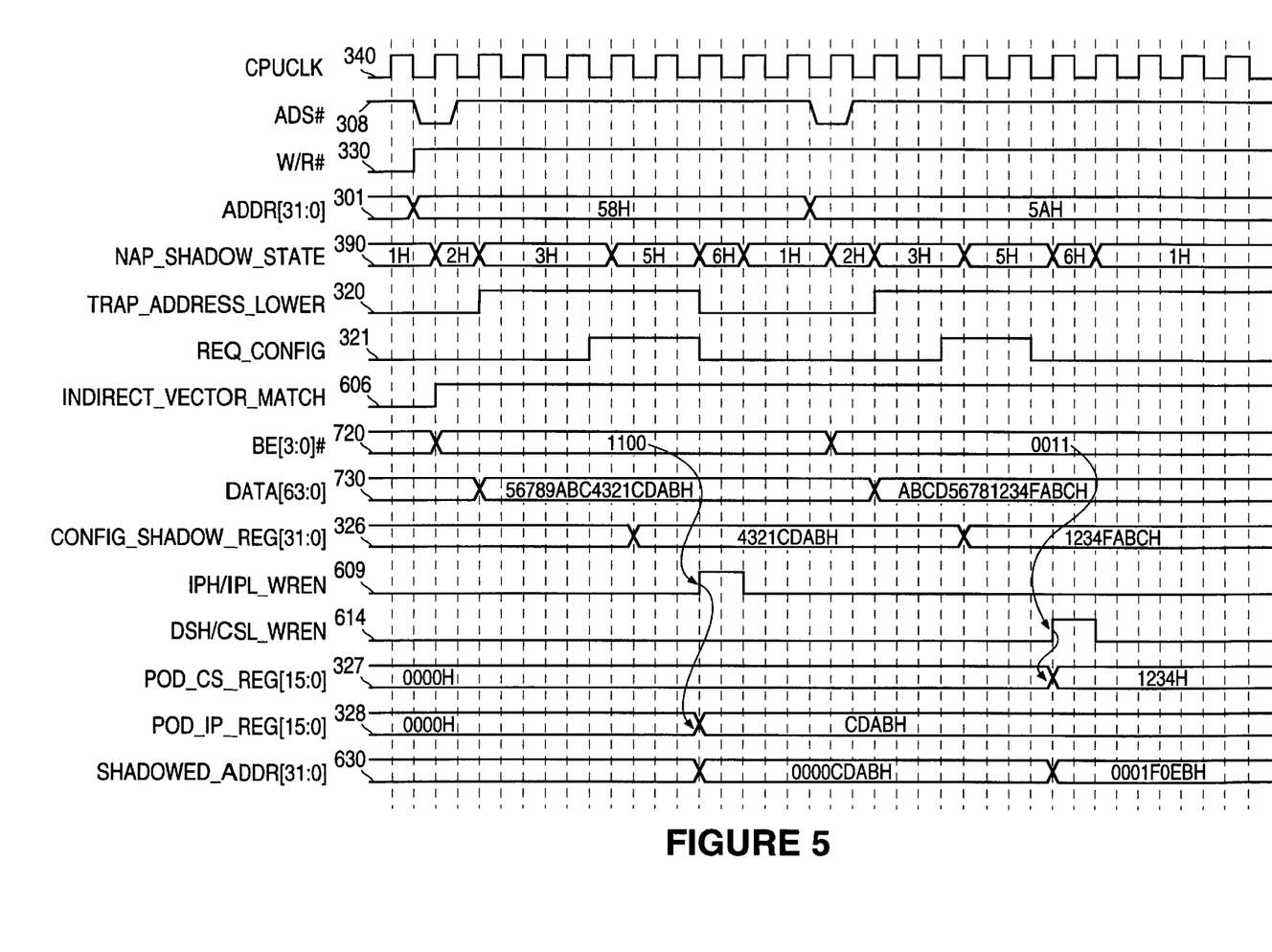
FIG. 5 is a timing diagram illustrating the operation of the nap shadowing state machine of FIG. 3 and the loading of the shadowed address.

FIG. 5 is a timing diagram illustrating the operation of the nap shadowing state machine of FIG. 3 and the loading of the shadowed address. CPUCLK 340 may be derived from the main processor clock and may be used to synchronize the operation of the nap shadowing state machine and configuration state machine. ADS# 308 indicates when the present address is a valid address. Nap mode may be triggered only during a valid address. W/R# signal 330 indicates whether an operation is a read or a write operation. ADDR[31:0] 301 is the present address. NAP_SHADOW_STATE 390 is the present nap shadow state machine state. TRAP_ADDRESS_LOWER signal 320 indicates whether the lower double-word contains the shadowed address. TRAP_ADDR_UPPER signal 607 (not shown in FIG. 5) indicates whether the upper double-word contains the shadowed address. In the example of FIG. 5, TRAP_ADDRESS_LOWER 320 is illustrated as active, and thus TRAP_ADDRESS_UPPER 607 would be low. REQ_CONFIG signal 321 going from high to low indicates when the address from the data bus was loaded into CONFIG_SHADOW_REG[31:0] 326. Upon receiving a high to low transition on the REQ_CONFIG signal 321, NAP SHADOWING STATE MACHINE 627 of FIG. 3 may generate appropriate control signals to generate the CS and IP values for a present address to be shadowed.

INDIRECT_VECTOR_MATCH 606 goes active when the present address matches a fixed or programmed software interrupt vector address, e.g., 58H for INT16H. The BE[3:0]# signals 720 are latched versions of BE[7:0]# and contain BE[7:4]# if the upper double-word is being written or BE[3:0]# if the lower double-word is being written. DATA[63:0] 730 are the data bus signals which in the present embodiment is a 64 bit bus. The data bus contains the CS and IP values of the shadowed interrupt whose vector is being written. CONFIG_SHADOW_REG[31:0] 326 contains the upper or lower double-word of data which was shadowed. The timing diagram of FIG. 5 illustrates TRAP_ADDRESS_LOWER 320 as active, thus the lower double-word of the 64-bit data bus is captured into CONFIG_SHADOW_REG[31:0] 326 and contains 4321CDABH. The nap shadow state machine, upon detecting a high to low transition on REG_CONFIG 321 uses the latched BE[3:0]# 720 to write the valid bytes of the current data into appropriate bytes of the CS and IP registers 327 and 328, respectively.

In this example, BE[3:0]# equals 1100 (binary) indicating that only the lower 2 bytes of data are valid and thus the low and high bytes of the IP are saved. The timing diagram of FIG. 5 illustrates the next cycle writing to the vector address with BE[3:0]# equal to 0011 (binary) indicating that the upper two bytes of the double-word of data captured in CONFIG_SHADOW_REG [31:0] 326 are valid. These form the CS upper and lower bytes. SHADOWED_ADDR [31:0] 630 is formed by multiplying the shadowed CS value by 16 and adding it to the IP value while appending zeroes to bits 31 to 20.

Figure 6:
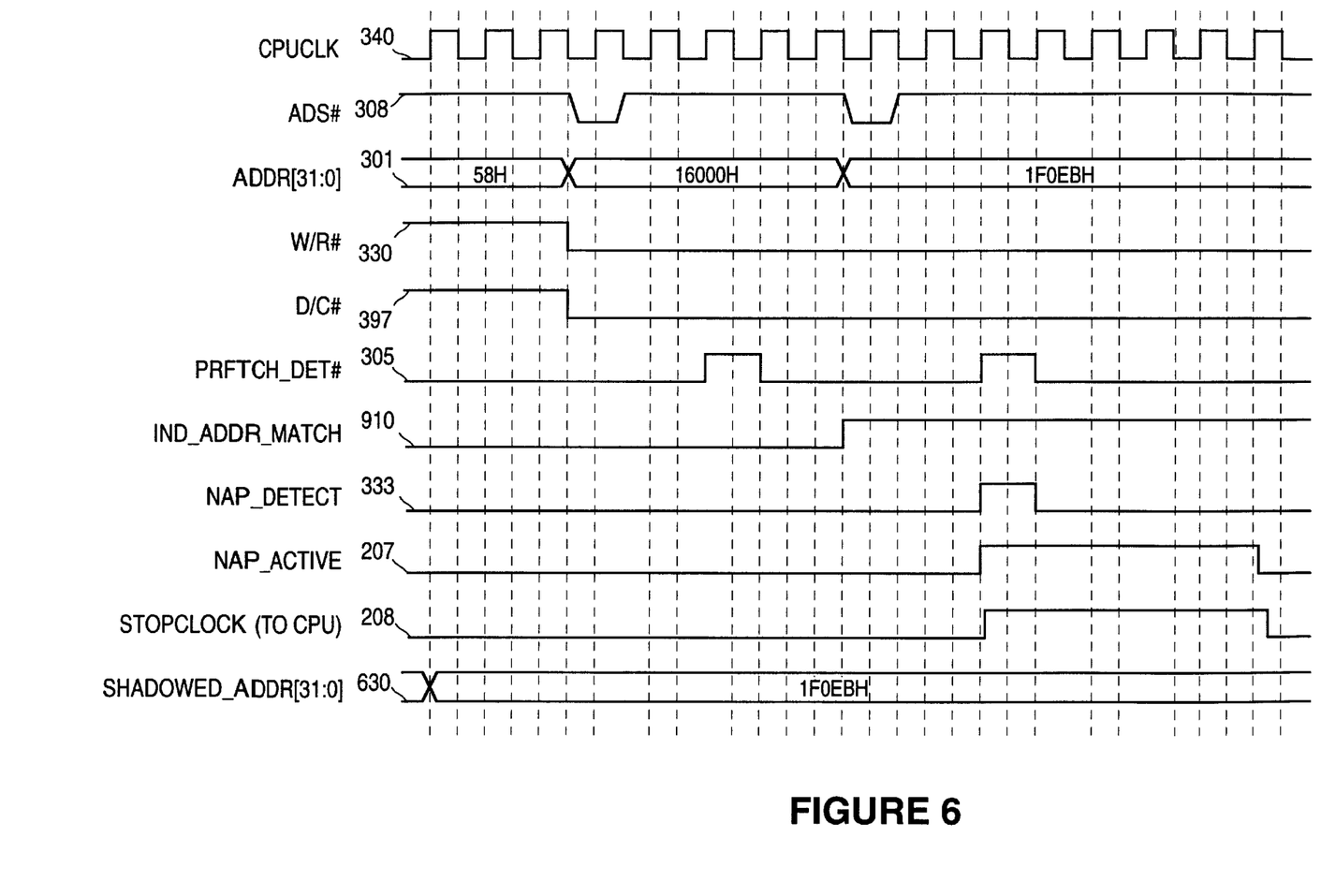
FIG. 6 is a timing diagram illustrating nap triggering upon detecting a shadowed address.

FIG. 6 illustrates the timing of triggering NAP mode, upon detecting the presence of the shadowed address, during which the STOPCLOCK signal to the CPU is throttled or asserted. If the current address on ADDR[31:0] 301 contains the value that matches the SHADOWED_ADDR[31:0] 630 of FIG. 5, the IND_ADDR_MATCH 910 signal is set. If W/R# signal 330 is low, indicating a memory read, and if D/C# signal 397 is low, indicating a code read, and PRFTCH_DET# signal 305 is inactive, indicating the current address was not part of a prefetch, NAP_DETECT signal 333 will be set. NAP_DETECT signal 333 sets the NAP_ACTIVE latch 207 which keeps nap mode active until a nap timer timeout or primary or secondary activity. During nap mode, STOPCLOCK signal 208 to the CPU may be throttled with a programmed duty cycle if throttling is enabled or kept asserted if LESSSTOP is enabled.

Figure 7:
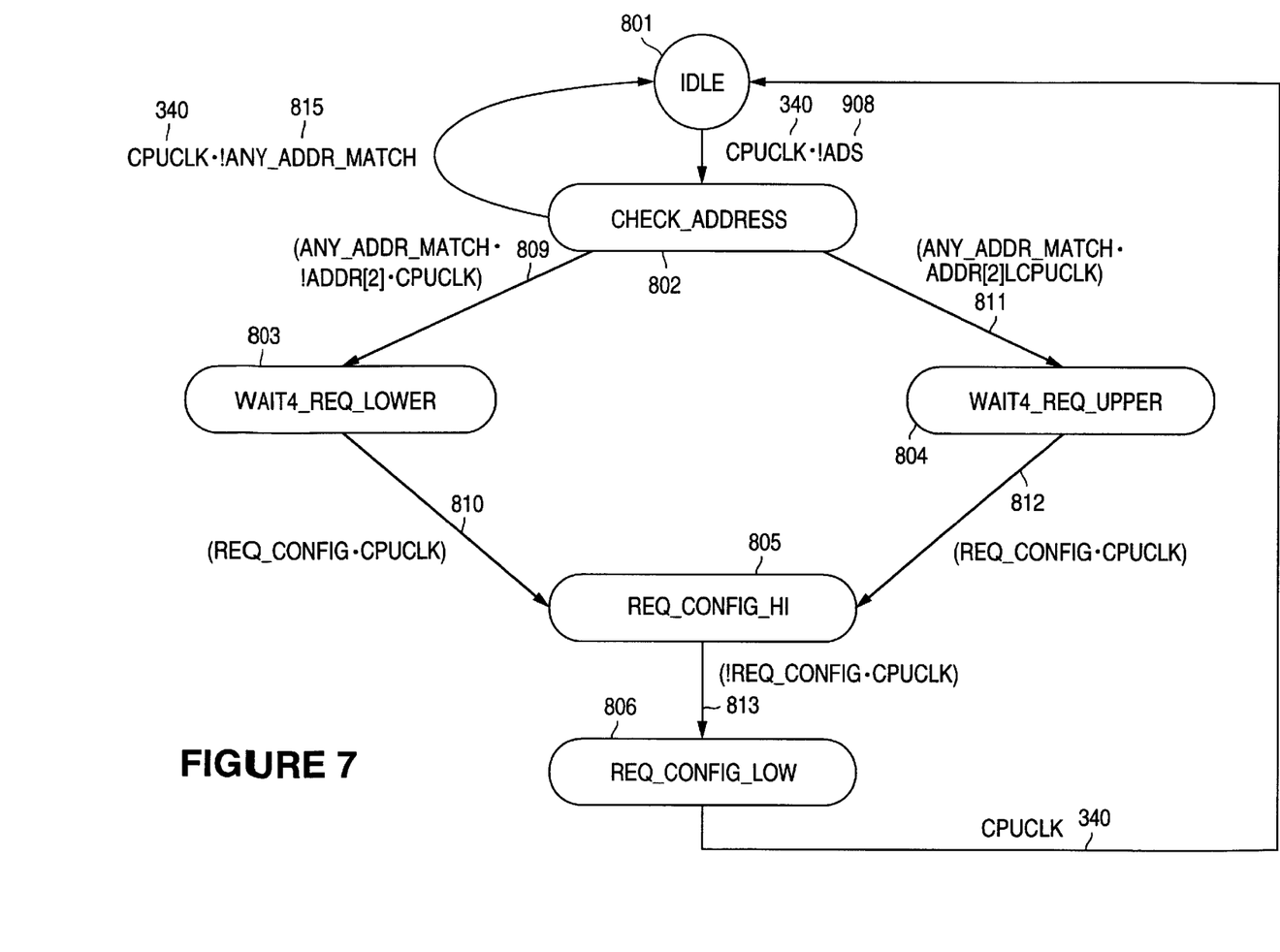
FIG. 7 is a state machine diagram illustrating the operation of the nap shadowing state machine of FIG. 3.

FIG. 7 is a state machine diagram illustrating the operation of the nap shadowing state machine. From IDLE state 801 a transition of CPUCLK 340 in conjunction with a low ADS# signal 308 may cause a state transition to CHECK_ADDRESS state 802. From CHECK_ADDRESS state 802, a transition of CPUCLK 340 in conjunction with a low ANY_ADDR_MATCH signal 815 may cause a state transition back to IDLE state 801. Also from CHECK_ADDRESS state 802, a transition of CPUCLK 340 in conjunction with ADDR[2] signal being high and ANY_ADDR_MATCH signal 815 in combination referred to as inputs 811, may cause a state transition to WAIT4_REQ_UPPER state 804. From WAIT4_REQ_UPPER state 804, a high REQ_CONFIG signal 321 in conjunction with CPUCLK 340 may cause a transition to REQ_CONFIG_HI state 805.

From CHECK_ADDRESS state 802, a transition of CPUCLK 340 in conjunction with a low ADDR[2] signal and ANY_ADDR_MATCH signal in combination referred to as inputs 809, may cause a state transition to WAIT4_REQ_LOWER state 803. From WAIT4_REQ_LOWER state 803 a high REQ_CONFIG signal 321 in conjunction with CPUCLK 340 may cause a transition to REQ_CONFIG_HI state 805.

From REQ_CONFIG_HI state 805, a transition of CPUCLK 340 in conjunction with a low REQ_CONFIG 321 may cause a transition to REQ_CONFIG_LOW state 806. Another transition of CPUCLK 340 may cause a final transition back to IDLE state 801.

Figure 8:
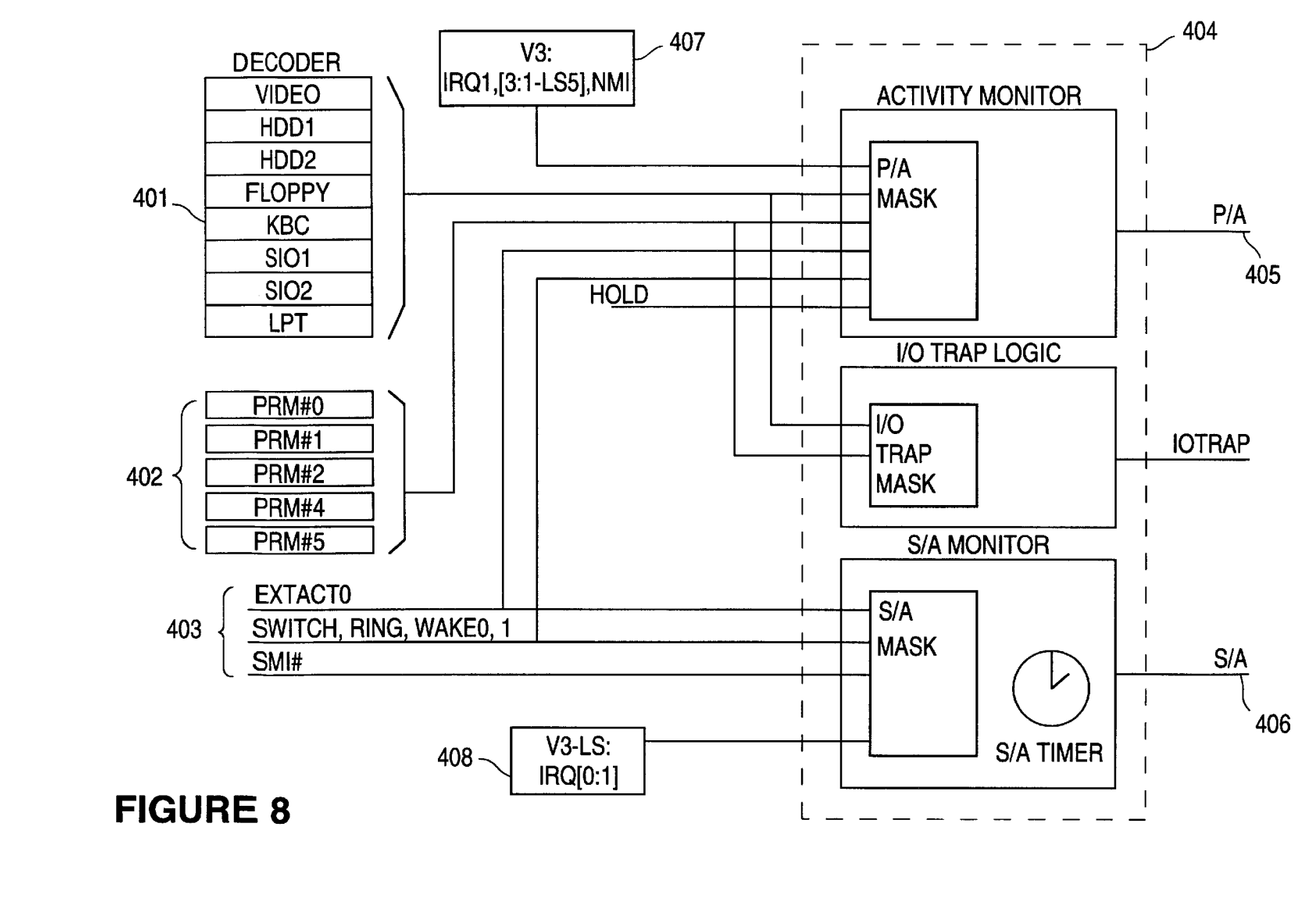
FIG. 8 is a block diagram illustrating primary and secondary activity generation.

In the preferred embodiment, primary and secondary activity signals may be used to inhibit nap triggering or end nap. Primary activity may be defined as important system activity where system resources may be being accessed. Unless masked, any primary activity may bring the system into fully awake mode. Primary activity may also reset power management timers. FIG. 8 illustrates primary activity register bank 402 coupled to activity monitoring circuit 404 and comprising PRM#0 through PRM#5. Any read or write accesses to addresses matching those stored in these registers in register bank 402 may trigger generation of primary activity, P/A signal 405. Accesses to VIDEO, hard drive or any devices shown in device register bank 401 may trigger generation of P/A signal 405 as may occurrence of any unmasked interrupt requests as in IRQ block 407.

Secondary activity may be defined as requiring a short amount of service time during various levels of inactivity. Unless masked, secondary activity may cause secondary events to be processed at full speed without throttling enabled. When a secondary event is serviced, the system may return to whatever mode the system was in prior to the occurrence of secondary activity. Secondary events 403 comprise EXACT0, SWITCH, RING, WAKE0 and 1, and SMI#s. These events are described in the VESUVIUS-LS PCI System Controller Advance Data Book, Version 0.6 March 1995, PICOPOWER a Cirrus Logic Company, p.54–67 incorporated herein by reference.

In addition to secondary events 403, secondary activity may be triggered by IRQ block 408. System Management Interrupts, SMI#s of secondary events 403 may allow activity to be programmed to trigger S/A signal 406 indicative of secondary activity. At least six device timers and at least three mode timers also may trigger S/A signal 406 through the generation of an SMI. Maximum flexibility may be achieved in the ability to program virtually any event as primary or secondary activity to suit power management goals. Once secondary events 403 or IRQ block 408 triggers secondary activity, S/A signal 406 may be generated.

Figure 9:
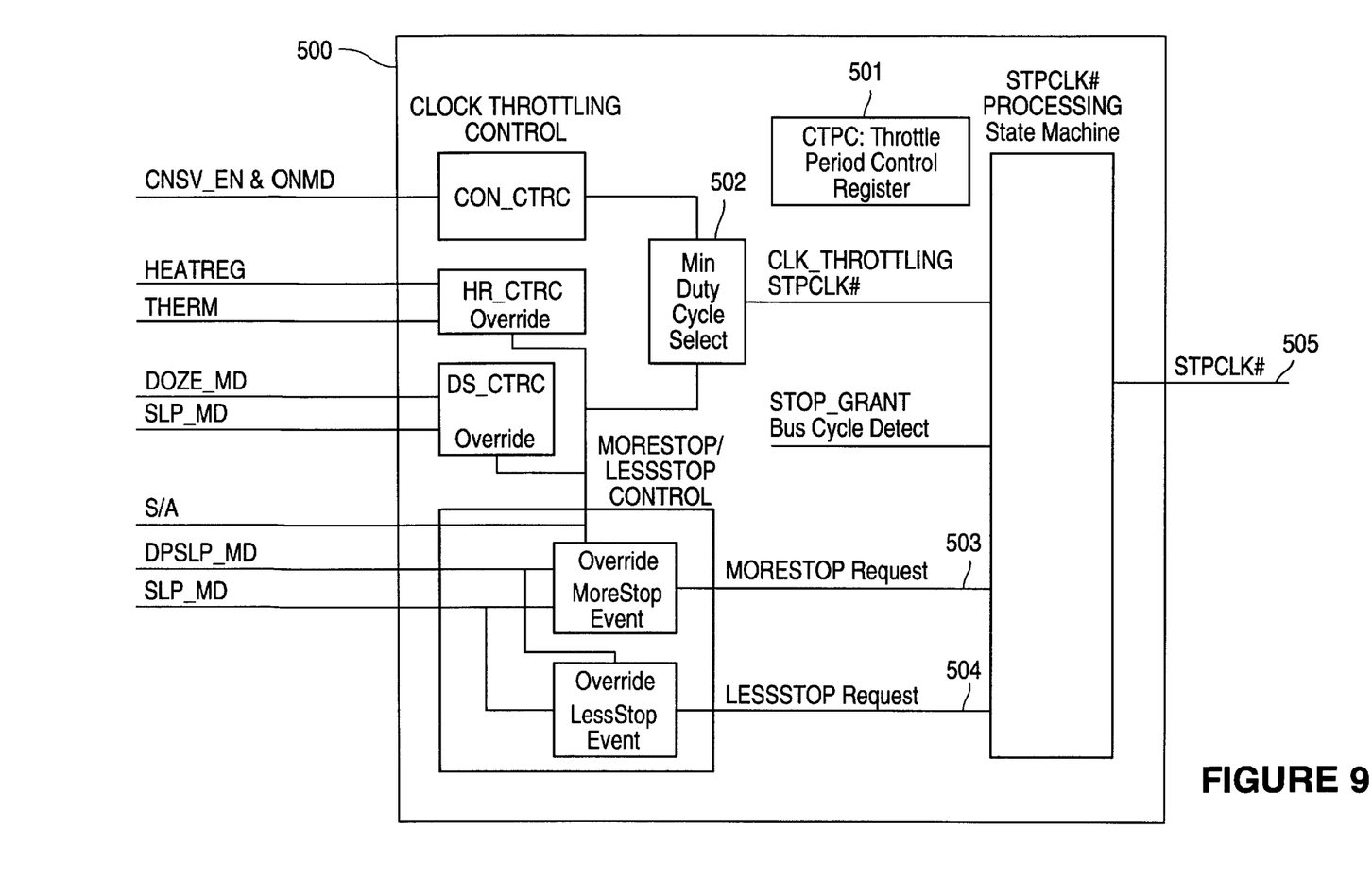
FIG. 9 is a block diagram illustrating throttling of the clock stopping signal and MORESTOP and LESSSTOP control.

In FIG. 9, stop clock control block 500 contains elements controlling generation of clock stopping signal STPCLK 505. Throttling period control register CTPC 501 stores a value corresponding to a throttling period. A throttling period may be a time interval during which clock stopping STPCLK 505 may be applied according to a duty cycle the value of which may be programmed in and read from a register. Duty cycle select block 502 controls the duty cycle of STPCLK 505 when it is applied during a throttling period.

MORESTOP request 503 and LESSSTOP request 504 may be input from applications or operating system software to indicate to the CPU that a higher or lower level of power conservation is desired. LESSSTOP request 405 may alter the level of sleep of the CPU by altering the duty cycle of the clock throttling circuit while the CPU clock continues to run. MORESTOP request 503 may control whether the CPU clock is stopped entirely during a throttling period or whenever STPCLK is asserted.

Unlike MORESTOP requests 503, the CPU clock may remain running during LESSSTOP requests 504. With the CPU clock running, the system may return instantly to processing when STPCLK 505 is removed. MORESTOP request 503 stops the CPU clock and upon removal of STPCLK, a latency period of up to 1 ms may be necessary to control CPU clock resynchronization and stabilization of the CPU PLL.

VIRTUAL POD IMPLICATIONS FOR A SYSTEM WITH CACHE

In order to ensure proper shadowing of the interrupt vector address in a system containing L1 (level one) or L2 (level two) caches, software must ensure, when writes to the CS and IP values to the table occur, that the address pointed to by CS:IP is not already cached in L1 or L2. If the line is already cached, then the address (CS:IP) triggering the nap detection may not be seen externally, and therefore nap triggering may not occur.

The apparatus of the present invention may make the vector table address (INT*4) non-cacheable such that any writes to the vector table address may be detected to shadow the loaded data. However, since applications can, at any time, write a new value of CS:IP to the vector table, software must ensure that it flushes and invalidates the line containing the shadowed CS:IP out of the cache. In a cached system, those lines could potentially exist in the cache already and an access to that address may not be detected, thus preventing the nap triggering mechanism.

While the preferred embodiment and various alternative embodiments of the invention have been disclosed and described in detail herein, it may be apparent to those skilled in the art that various changes in form and detail may be made without departing from the spirit and scope of the invention.

For example, while the prefetch detect circuit illustrated herein as receiving a line of addresses thirty-two bytes long, the present invention could be practiced on systems with greater or lesser addressing capability. The use of shadowed addresses while encompassing those interrupts or events known to be indicative of inactivity, could be practiced on any fixed interrupt number or detectable event. Moreover, although the preferred embodiment is drawn to an integrated circuit, the present invention may be applied to a series of integrated circuits, or in other circuitry within a computer system without departing from the spirit and scope of the present invention.

We claim:

1. A circuit for initiating power conservation upon detection of inactivity in a system, the circuit comprising:
   a first register for storing a first shadowed address;
   a detector for detecting access to a second shadowed address indicative of system inactivity;
   a comparison block coupled to the detector and to the first register, the comparison block receiving and comparing the first shadowed address with the second shadowed address, the comparison block generating a first signal if the first shadowed address matches the second shadowed address, such that the first signal results in inhibition of a system clock power conservation.

2. A method of conserving power in a computer system by controlling the application of a clock stopping signal in a system controller, said method comprising the steps of:
   detecting a nap triggering event in a computer system and activating a nap signal by storing a value in a register corresponding to a shadowed address, trapping a shadowed address, comparing the shadowed address with a present address, generating a nap signal if the present address matches the value stored in said register, and updating the shadowed addresses by detecting a write to an interrupt vector;
   inhibiting the nap signal during a processor prefetch cycle, unless a present address is a first address in a prefetch cycle;
   detecting primary and secondary activity and inhibiting the nap signal if said primary and secondary activity are present; and
   applying the clock stopping signal during a throttling period according to a programmable duty cycle while the nap signal is active.

3. The method of claim 2 wherein said step of inhibiting the nap signal during a processor prefetch cycle further comprises the steps of:
   storing a value in a register corresponding to the previous address;
   comparing the value with a present address; and
   generating a prefetch detect signal if the present address differs from the previous address by a value of one.

4. The method of claim 2 wherein said step of detecting primary and secondary activity and inhibiting said nap signal if said primary and secondary activity are present further comprises the steps of:
   storing at least one value in a first at least one register corresponding to primary activity,
   storing at least one value in a second at least one register corresponding to secondary activity,
   detecting primary activity if said first at least one register value matches present activity,
   detecting secondary activity if said second at least one register value matches present activity,
   inhibiting said nap signal if primary activity is detected, and
   inhibiting said nap signal if secondary activity is detected.

5. The method of claim 4 wherein said step of detecting primary activity if said first at least one register value matched present activity further comprises:
   storing a value in said first at least one register, said value comprising at least one of an address, and a hardware signal.

6. The method of claim 4 wherein said step of detecting secondary activity if said first at least one register value matched present activity further comprises:
   storing a value in said first at least one register, said value comprising at least one of an address, and a hardware signal.

7. The method of claim 4 wherein said step of inhibiting said nap signal if primary activity is detected further comprises the steps of:
   communicating a signal to a throttling circuit for controlling the application of a clock stopping signal, said signal for terminating the application of said clock stopping signal in a present power conservation mode.

8. The method of claim 4 wherein said step of inhibiting said nap signal if secondary activity is detected further comprises the step of:

communicating a signal to a throttling circuit for controlling the application of a clock stopping signal, said signal for suspending said application of said clock stopping signal in a present power conservation mode.

9. The method of claim 8 wherein said step of communicating a signal to a throttling circuit further comprises the step of:

restoring said application of said clock stopping signal in a previous power conservation mode if said secondary activity is no longer detected.

10. The method of claim 4 further comprising the steps of:

reading a programmable timeout value stored in a register, comparing the programmable timeout value with a NAP counter output, and generating a timeout signal if the programmable timeout value equals the NAP counter output.

11. A method of conserving power in a computer system by controlling the application of a clock stopping signal in a system controller, said method comprising the steps of:

detecting a nap triggering event in a computer system and activating a nap signal by storing a value in a register corresponding to a shadowed address, trapping a shadowed address, comparing the shadowed address with a present address, generating a nap signal if the present address matches the value stored in said register, and updating the shadowed addresses by detecting a write to an interrupt vector;

inhibiting the nap signal during a processor prefetch cycle unless a present address is a first address in a prefetch cycle by storing a value in a register corresponding to the previous address, comparing the value with a present address, and generating a prefetch detect signal if the present address differs from the previous address by a value of one;

detecting primary and secondary activity and inhibiting the nap signal if said primary and secondary activity are present; and applying the clock stopping signal during a throttling period according to a programmable duty cycle while the nap signal is active.

12. The method of claim 11 wherein the step of detecting the nap triggering event and generating the nap signal further comprises the steps of:

storing a value in a register corresponding to a shadowed address;

trapping a shadowed address;

comparing the shadowed address with a present address;

generating a nap signal if the present address matches the value stored in said register; and updating the shadowed addresses by detecting a write to an interrupt vector.

13. The method of claim 11 wherein said step of detecting primary and secondary activity and inhibiting said nap signal if said primary and secondary activity are present further comprises the steps of:

storing at least one value in a first at least one register corresponding to primary activity, storing at least one value in a second at least one register corresponding to secondary activity, detecting primary activity if said first at least one register value matches present activity, detecting secondary activity if said second at least one register value matches present activity, inhibiting said nap signal if primary activity is detected, and inhibiting said nap signal if secondary activity is detected.

14. The method of claim 13 wherein said step of detecting primary activity if said first at least one register value matched present activity further comprises:

storing a value in said first at least one register, said value comprising at least one of an address, and a hardware signal.

15. The method of claim 13 wherein said step of detecting secondary activity if said first at least one register value matched present activity further comprises:

storing a value in said first at least one register, said value comprising at least one of an address, and a hardware signal.

16. The method of claim 13 wherein said step of inhibiting said nap signal if primary activity is detected further comprises the steps of:

communicating a signal to a throttling circuit for controlling the application of a clock stopping signal, said signal for terminating the application of said clock stopping signal in a present power conservation mode.

17. The method of claim 13 wherein said step of inhibiting said nap signal if secondary activity is detected further comprises the step of:

communicating a signal to a throttling circuit for controlling the application of a clock stopping signal, said signal for suspending said application of said clock stopping signal in a present power conservation mode.

18. The method of claim 16 wherein said step of communicating a signal to a throttling circuit further comprises the step of:

restoring said application of said clock stopping signal in a previous power conservation mode if said secondary activity is no longer detected.

19. The method of claim 13 further comprising the steps of:

reading a programmable timeout value stored in a register, comparing the programmable timeout value with a NAP counter output, and generating a timeout signal if the programmable timeout value equals the NAP counter output.

20. A power conservation circuit comprising:

a nap triggering circuit receiving a first signal and generating a second signal when the first signal is indicative of system inactivity, the nap triggering circuit comprising a first shadow register receiving and storing a first shadowed address, a first logic block receiving the first signal and trapping the first signal into a second shadowed address, and a comparison block coupled to the first shadow register and to the first logic block, the comparison block receiving and comparing the first shadowed address with the second shadowed address and generating the second signal if the second address matches the first shadowed address; and a second logic block updating the first shadowed address stored within the first shadow register with the second shadowed address trapped within the first logic block;

a prefetch detect circuit receiving the first signal and generating a third signal when the first signal is the product of a prefetch cycle; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

21. A power conservation circuit comprising:

a nap triggering circuit receiving a first signal and generating a second signal when the first signal is indicative of system inactivity;

a prefetch detect circuit receiving the first signal and generating a third signal when the first signal is the product of a prefetch cycle, the prefetch detect circuit comprising a first register receiving and storing a prior address, a decoder receiving the first signal and translating the first signal into a present address, and a logic block coupled to the register and to the decoder, the logic block receiving the present address and determining whether the present address is a shadow address, the logic block comparing the previous address with the present address if the present address is a shadowed address, the logic block generating a prefetch detect signal if the previous address differs from the present address by a value of one; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

22. A power conservation circuit comprising:

a nap triggering circuit receiving a first signal and generating a second signal when the first signal is indicative of system inactivity, the nap triggering circuit comprising a first shadow register receiving and storing a first shadowed address, a first logic block receiving the first signal and trapping the first signal into a second shadowed address, and a comparison block coupled to the first shadow register and to the first logic block, the comparison block receiving and comparing the first shadowed address with the second shadowed address and generating the second signal if the second address matches the first shadowed address;

a prefetch detect circuit receiving the first signal and generating a third signal when the first signal is the product of a prefetch cycle; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation, the throttling circuit comprising a first register for storing a first value corresponding to a duration of a time period, a second register for storing a second value corresponding to a duty cycle of the clock stopping signal, and a logic block, coupled to the first and second registers, for receiving the first and second values and the second signal, the logic block enabling the throttling circuit to apply the clock stopping signal in response to the second signal and according to the first and second values.

23. The power conservation circuit of claim 22, wherein said throttling circuit further comprises:

a third register for receiving a third signal indicative of a request to reduce power conservation in a CPU; and a duty cycle select block responsive to the third signal for altering the duty cycle of the clock stopping signal.

* * * * *